March 1, 1932. A. H. BIERTUEMPFEL 1,847,687
CAKE DISPLAY DEVICE
Filed April 15, 1930  2 Sheets-Sheet 1

INVENTOR.
Albert H. Biertuempfel
BY
ATTORNEY.

March 1, 1932.  A. H. BIERTUEMPFEL  1,847,687
CAKE DISPLAY DEVICE
Filed April 15, 1930   2 Sheets-Sheet 2

INVENTOR.
Albert H. Biertuempfel
BY
George D. Richards
ATTORNEY.

Patented Mar. 1, 1932

1,847,687

UNITED STATES PATENT OFFICE

ALBERT H. BIERTUEMPFEL, OF NEWARK, NEW JERSEY

CAKE DISPLAY DEVICE

Application filed April 15, 1930. Serial No. 444,382.

This invention relates, generally, to displays useful for ornamental purposes during anniversaries and other celebrations, and the invention has reference, more particularly, to a novel cake display and cake display device simulating an anniversary cake.

Heretofore, it has been common practice to provide anniversary cakes and simulated cakes, such as those made of icing and having hollow interiors, with wax candles for ornamental purposes. The use of such candles is objectionable not only because of the fire hazard involved but also because they soon burn down necessitating replacement and sometimes cause wax to run over the cake proper, thereby causing the same to have an unattractive appearance and necessitating removal of the wax in the event that the cake is to be consumed.

The principal object of the present invention is to provide a novel cake display and cake display device so constructed and arranged as to provide for the safe ornamental electric illumination thereof.

Another object of the present invention lies in the provision of a cake display and display device which is adapted to serve as one layer of a multi-layer simulated cake, the said device having means for illuminating the interior of the superimposed cake layers.

Other objects of the present invention, not at this time more particularly enumerated, will be clearly understood from the following detailed description of the same.

The invention is clearly illustrated in the accompanying drawings, in which:—

Similar characters of reference are employed in all of the hereinabove described views, to indicate corresponding parts.

Figure 1:
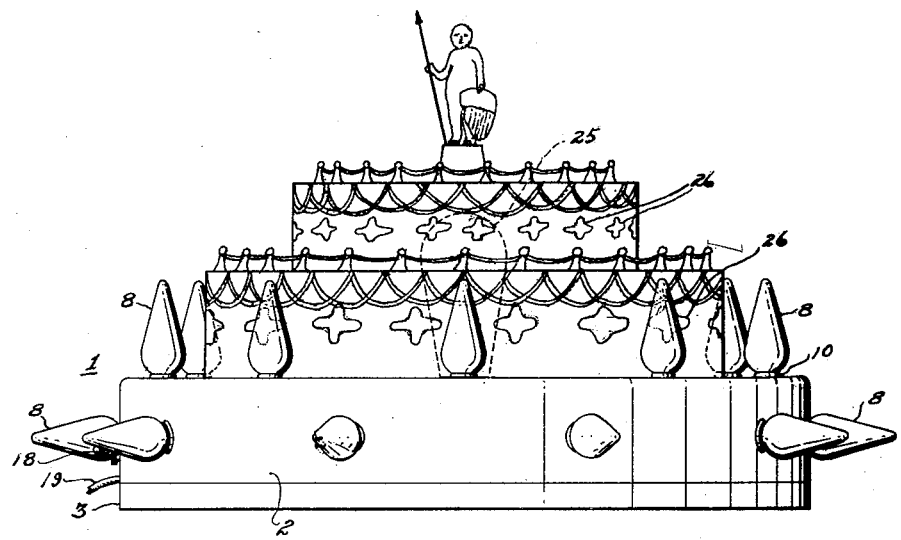
Fig. 1 is a view in elevation of the novel cake display device of the present invention, the said device being illustrated as constituting the lowermost layer of a multi-layer simulated cake display.
Figure 2:
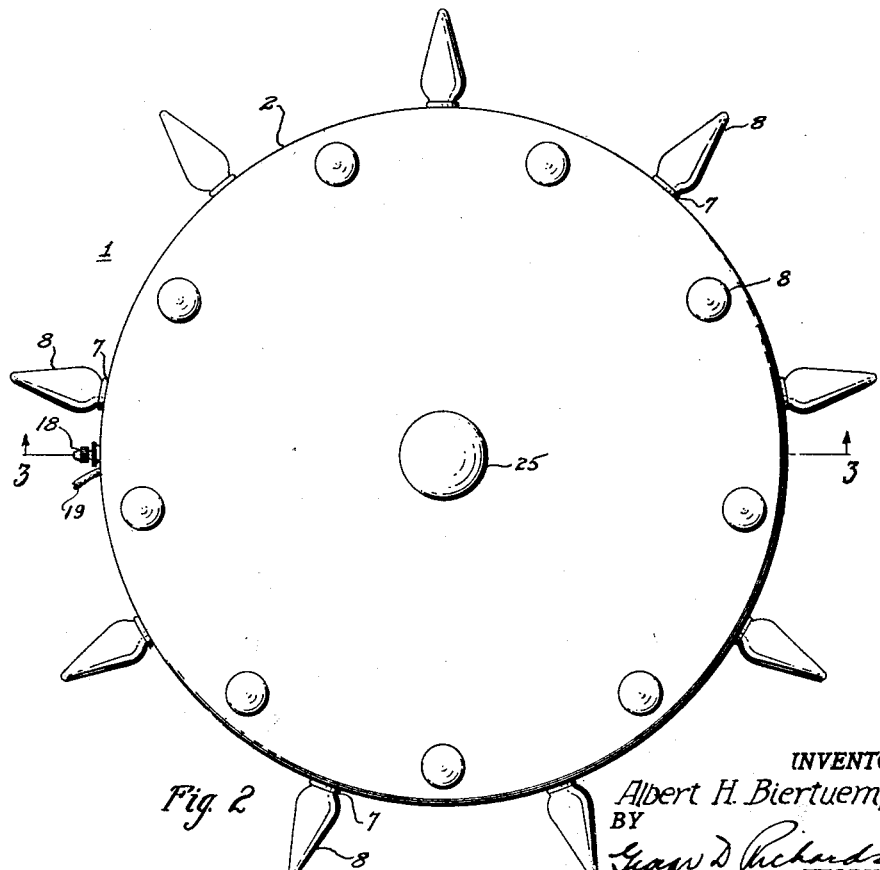
Fig. 2 is a plan view of the novel cake display device of the present invention.
Figure 3:
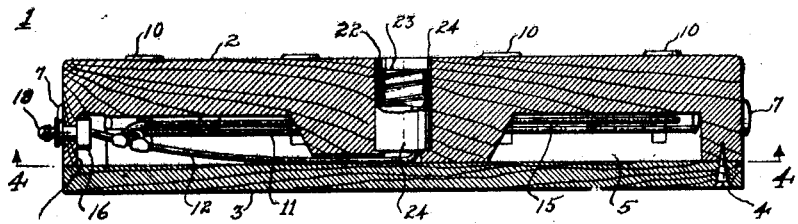
Fig. 3 is a sectional view taken substantially along line 3—3 of Fig. 2 looking in the direction of the arrows with the electric light bulbs omitted.
Figure 4:
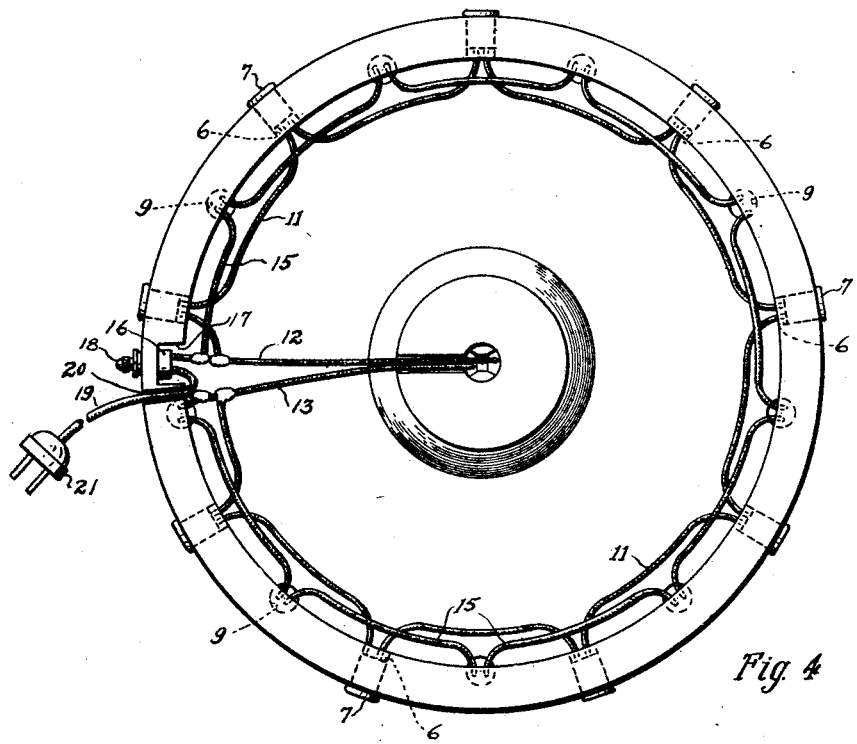
Fig. 4 is a view taken along line 4—4 of Fig. 3 looking in the direction of the arrows.

Referring now to the said drawings, the reference numeral 1 designates the novel cake display device of this invention as a whole. Cake display device 1 comprises a cylindrical casing 2 as of wood closed at its top and open at its bottom. A base plate 3 is secured as by screws 4 to the bottom of casing 2. Casing 2 together with the base plate 3 have the form of a cake or cake layer. Casing 2 is provided with an annular interior chamber 5. The side walls of casing 2 are provided with a plurality of spaced, radially extending circular apertures 6 shown for purposes of illustration as nine in number within which are frictionally retained or otherwise secured, electric light sockets 7. Light sockets 7 are illustrated as of the type adapted to receive the small ornamental 12 volt lamps 8 such as are used on Christmas trees.

The top of casing 2 is provided with a plurality of spaced, circumferentially arranged apertures 9 also illustrated as nine in number within which are frictionally retained or otherwise secured electric light sockets 10 which are similar to sockets 7 and are adapted to receive light bulbs 8. Apertures 6 and 9 extend to the chamber 5 within which is contained the necessary wiring for supplying current to sockets 7 and 10. Sockets 7 are connected in series by wiring 11 and to the supply leads 12 and 13, whereas sockets 10 are connected in series by wiring 15 and to said supply leads 12 and 13. A snap switch 16 is mounted in a recess 17 provided in the wall of casing 2 and has an exterior operating knob 18. Switch 16 is included in the circuit of supply lead 12 and thereby controls the supply of current to lamps 8. Supply leads 12 and 13 extend within a sheathing 19 through an aperture 20 provided in the side wall of casing 2 and externally of the display device to the plug 21 adapted for insertion into a convenience outlet.

The top of casing 2 is provided with a central recess 22 within which a standard 110 volt socket 23 is positioned. Socket 23 is insulated from the walls of recess 22 by an insulating bushing 24. Socket 23 is furnished with current by supply leads 12 and 13. Socket 23 is adapted to receive a standard light bulb as 25.

In use, the novel cake display device is adapted to serve as the lowermost layer of a multi-layer cake or as a base upon which a cake is mounted as shown in Fig. 1 of the drawings. When the cake layer or layers mounted upon the display device are genuine cakes, the bulb 25 would ordinarily be omitted, but when such cake layers are hollow simulated cakes as of icing, preferably having windows as 26, the bulb 25 is used and light from this bulb shines through the windows 26 from within, thereby greatly enhancing the beauty of the display. Switch 16 simultaneously controls the lighting of bulb 25 and bulbs 8 so that internal and external ornamental lighting are obtained simultaneously causing the cake display to have a very pleasing and attractive appearance. If desired, the novel cake display device may be used alone without any superimposed cake layer or layers.

It will be apparent that a greater or lesser number of sockets such as 7 and 10 may be used in the novel cake display device as desired, the said sockets being placed at various points on or around the casing 2.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a simulated cake display having a plurality of cake layers, a device to serve as the lowermost cake layer comprising a casing closed at its top and open at its bottom, a base plate for covering the bottom of said casing, a plurality of spaced openings provided in said casing, electric light sockets retained within said openings, wiring contained within said casing and connected to said sockets for conducting energizing current thereto and a control switch mounted on said casing and controlling the supply of current through said wiring to said sockets.

2. In a simulated cake display having a plurality of cake layers, the lowermost of said layers comprising a hollow cylindrical casing having spaced radially extending apertures in the side walls thereof and a central recess in the top thereof, electric light sockets positioned within said apertures and in said central recess and adapted to receive electric light bulbs, wiring within said casing and connected in current supplying relation to said light sockets, the upper layers of said cake display being hollow and having windows therein, whereby light emitted by the light bulb at the top of said lowermost layer passes outwardly through said windows.

3. In a simulated cake display having a plurality of cake layers, the lowermost of said layers comprising a hollow cylindrical casing having spaced radially extending apertures in the side walls thereof, spaced circumferentially arranged apertures and a central recess in the top thereof, electric light sockets positioned within said apertures and in said central recess, electric light bulbs threaded into said sockets, wiring contained within said casing and connected in current supplying relation to said light sockets, a switch mounted within said casing and connected in said wiring, said switch having an operating knob extending exteriorly of said casing, the upper layers of said cake display being hollow and having windows therein, whereby light emitted by the light bulb at the center of the top of said casing passes outwardly through said windows.

In testimony, that I claim the invention set forth above I have hereunto set my hand this 1st day of April, 1930.

ALBERT H. BIERTUEMPFEL.